Feb. 13, 1923.
S. B. HARVEY
1,444,915
SMOKER'S PIPE PACKING DEVICE
Filed Sept. 19, 1919
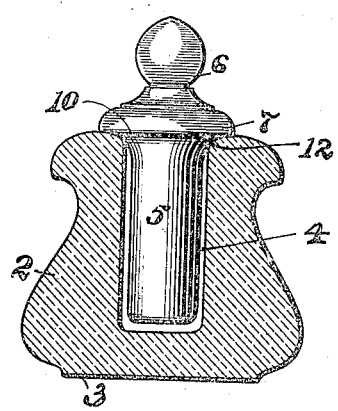
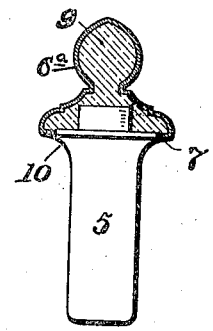
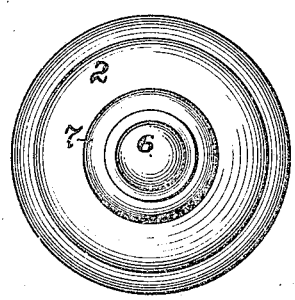
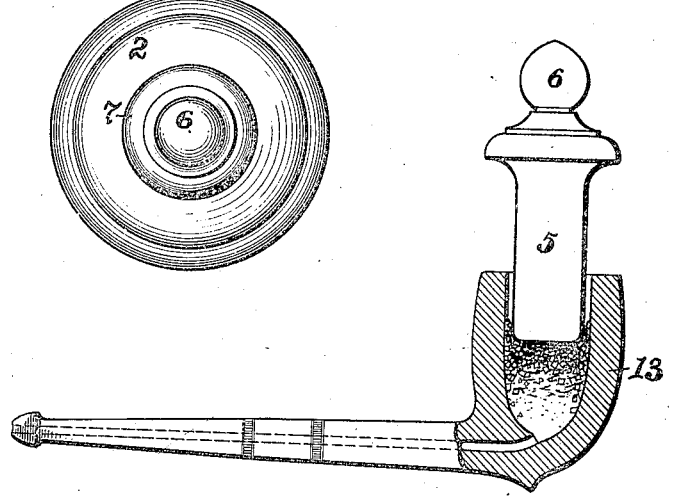
Inventor
Sylvester B. Harvey
By
His Attorney Patented Feb. 13, 1923.

1,444,915

UNITED STATES PATENT OFFICE.

SYLVESTER B. HARVEY, OF PHILADELPHIA, PENNSYLVANIA.

SMOKER'S PIPE-PACKING DEVICE.

Application filed September 19, 1919. Serial No. 324,798.

*To all whom it may concern:*

Be it known that I, SYLVESTER B. HARVEY, a citizen of the United States, and resident of Philadelphia, county of Philadelphia, and State of Pennsylvania, have invented an Improvement in Smokers' Pipe-Packing Devices, of which the following is a specification.

My invention consists of a plunger, preferably of refractory material such as glass, lava and the like, which may be made smooth and proof against rust or chemical action at the temperature of the hot ashes in the pipe bowl, said plunger provided with a handle portion at one end and flat on the other end and of a diameter to easily fit into a bowl of a pipe, the plunger being desirably enlarged adjacent the handle end and associated with a stand having a recess of greater diameter than the plunger and less than the diameter of the enlarged handle end whereby the plunger may be suspended within the recess when not in use.

My invention will be better understood by reference to the drawings, in which: Fig. 1 is a sectional view of the pipe packing device embodying my invention; Fig. 2 is a plan view of the same; Fig. 3 is a sectional view showing the use of the packing plunger in packing the unconsumed tobacco and ash in the pipe; and Fig. 4 is an elevation with part in section, showing a modified construction of the plunger.

2 is a stand having a flat base 3 and provided at its upper part with the vertical recess 4, flaring at the mouth as indicated at 12. The plunger 5 is preferably cylindrical in cross section, flat on its lower end and flaring outward at 10 into an annular flange 7 extended upward into the handle portion 6. The diameter of the plunger 5 is considerably less than the diameter of the recess 4 in the stand, and its length is also less than the length of the recess so that it may hang or be suspended therein without contact with its bottom or side walls. The flaring portions 7 and 10 of the plunger rest upon the flaring mouth portion 12 of the recess 4; and as these constitute more or less of a conical connection, it is manifest that the plunger will be centralized when dropped into the recess. The handle part 6 may be shaped and roughened so as to be easily grasped and held.

The stand 2 is preferably molded or pressed from glass or other material brought to a plastic condition, but it is evident that, if desired, it may be of drawn, stamped or cast metal, so long as the general shape of the recess and its adaptability to receive the plunger is maintained.

The plunger 5 and its handle portion may be formed integral of one piece cast or molded, preferably of glass or vitrous material such as lava, but it may, if desired, be made of metal. Where special ornamentation is desired, the plunger 5 may be of vitrous material and surmounted with a stamped silver or other metal handle portion $6^a$ cemented upon the plunger as indicated at 9, Fig. 4.

Where used in packing a pipe bowl, the plunger 5 is inserted into the bowl 13 as shown, in Fig. 3, and by hand manipulation, the half burned contents thereof may be packed down firmly in the bottom of the bowl to provide space for introduction of more fresh tobacco.

While I have shown a stand 2 of considerable bulk for normally supporting the plunger device, such as would be desirable where employed on a table or stand, nevertheless, when the plunger is to be carried with the smoker, this stand may be of light construction as a protecting covering to the plunger to prevent soiling the pockets of the user.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, without departing from the spirit or scope of the invention.

Having now described my invention what I claim as new and desire to secure by Letters Patent, is:

1. A smoker's pipe packing device comprising a plunger of less diameter than the diameter of the pipe bowl, flattened on its bottom end, and provided with a flaring handle portion at the top end, combined with a stand having a vertical recess of greater diameter and length than the plunger and having its upper end adapted to receive the flaring handle portion for supporting the plunger in a suspended condition within the recess.

2. A smoker's pipe packing device consisting of a plunger of refractory material with a flattened bottom and a handle at the top, the plunger having a diameter less than the opening in the pipe bowl, combined with an enclosing and supporting means for the plunger comprising a stand provided with a recess having a depth greater than the plunger, said plunger fitting the upper part of the stand so as to be centralized and suspended in the recess thereof and with the handle exposed.

3. A smoker's pipe packing outfit consisting of a stand having a vertical recess of substantially uniform diameter and flaring at its upper end into a more or less conical entrance and terminating in an upper flat portion, combined with a detachable plunger having a cylindrical body of considerably less diameter than the diameter of the recess and of a length considerably shorter than the depth of the recess, said plunger having at its upper part a handle portion terminating in an annular rim adapted to rest upon the flat top of the receptacle and also having an annular curved portion extending upwardly from the cylindrical body portion of the plunger to form a conical part immediately below the annular rim, said conical part of the plunger operating in conjunction with the flaring part of the recess to centralize the plunger within the receptacle and maintain it out of contact with the side walls of the recess.

In testimony of which invention, I hereunto set my hand.

SYLVESTER B. HARVEY.